United States Patent [19]

Balaban et al.

[11] Patent Number: 4,775,890

[45] Date of Patent: Oct. 4, 1988

[54] PHASE DETECTOR

[75] Inventors: Alvin R. Balaban, Lebanon; Steven A. Steckler, Clark, both of N.J.

[73] Assignee: RCA Licensing Corporation, Princeton, N.J.

[21] Appl. No.: 62,016

[22] Filed: Jun. 11, 1987

[51] Int. Cl.⁴ .............................................. H04N 5/04
[52] U.S. Cl. .................................... 358/148; 358/158; 358/153; 307/510; 307/525; 328/133; 375/118
[58] Field of Search ............... 358/148, 149, 150, 158, 358/159, 153; 307/358, 510, 514, 525, 516, 526, 518; 328/133, 134; 375/118, 119, 120

[56] References Cited

U.S. PATENT DOCUMENTS

| | | | |
|---|---|---|---|
| 4,264,866 | 4/1981 | Benes | 307/516 |
| 4,277,754 | 7/1981 | Minakuchi | 307/514 |
| 4,333,055 | 6/1982 | Crackel | 307/514 |
| 4,636,861 | 1/1987 | Willis | 358/150 |
| 4,639,780 | 1/1987 | Willis | 358/158 |

OTHER PUBLICATIONS

A data sheet dated May 1985, entitled Digit 2000 NTSC Double-Scan VLSI TV System that includes a chapter entitled DPU 2532 Deflection Processor Unit, published by ITT Corporation Intermetall Division, pp. 48-72 being included.
A data sheet dated Jun. 1985 entitled Digit 2000 VLSI Digital TV System that includes a chapter entitled DPU 2500 Deflection Processor Unit, published by ITT Corporation, Intermetall Semiconductor Division, West Germany, pp. 111-134 included.

Primary Examiner—James J. Groody
Assistant Examiner—Michael D. Parker
Attorney, Agent, or Firm—Eugene M. Whitacre; Joseph J. Laks; Sammy S. Henig

[57] ABSTRACT

A horizontal phase detector of a television apparatus receives an analog composite video signal that is sampled and digitized at a rate determined in accordance with a clock signal. The leading edge of a simulated sync pulse signal is computed from the digitized signal using interpolation. The phase detector also receives a second signal that is indicative of a transition edge of a horizontal oscillator signal. The timing of the transition edge is contained in first and second signal parts. The first part is a periodic signal having a transition edge coincident with that of the clock signal, and the second part is a skew signal that represents a fraction of the period of the clock signal. The leading edge of the computed sync pulse signal is phase-compared with the oscillator transition edge to generate a phase difference signal for synchronizing horizontal oscillator operation.

20 Claims, 2 Drawing Sheets

PHASE DETECTOR

The invention relates to a phase detector that may be used in a phase-lock-loop circuit of, for example, a digital television apparatus.

In digital television, for example, it may be desirable to generate the deflection current using a phase-lock-loop circuit (PLL). A periodic output signal of the PLL that is used for driving, for example, a horizontal output stage is synchronized to an incoming synchronizing signal such as the horizontal sync pulses of a baseband television signal.

Unlike in an analog PLL circuit that utilizes a voltage controlled oscillator (VCO) having a controllable frequency, it may be desirable to operate the PLL circuit of the digital television synchronously with a common system clock having, for example, a constant frequency.

The periodic output signal, generated by the digital PLL circuit, may include two parts: a first signal part that changes states or has a transition edge coincidental with the system clock and a second signal part that is indicative of a fraction of the clock period and that may be updated once in each cycle of the periodic signal. A timing edge of the periodic output signal may be defined to occur at an instant corresponding to the fraction of the clock period that follows the transition edge of the first signal part. The fraction of the clock period is determined in accordance with the second signal part. The information contained in the second signal part may be referred to as skew information. An example of a PLL that generates signals such as the first and second signal parts is described in U.S. Pat. No. 4,639,780 in the name of D. H. Willis, entitled TELEVISION SYNCHRONIZING APPARATUS (the Willis patent).

In such digital phase-lock-loop circuit, the incoming synchronizing signal, such as, for example, the horizontal sync pulses of a baseband television signal, is sampled at the system clock rate and then digitized in an analog-to-digital converter. The resulting digitized synchronizing signal and the periodic output signal of the PLL are coupled to corresponding input ports of a phase detector of the digital PLL that generates a feedback, phase difference signal from the two signals.

For obtaining the phase difference signal, some prior art digital phase detectors utilize information obtained in each sampling period of the system clock throughout the duration of the sync pulse. Disadvantageously, a noise signal accompanying the sync pulse may affect, in such prior art detector, the phase difference signal any time throughout the sync pulse when such noise appears at the sampling instants.

It may be desirable to reduce the effect of such noise signal by utilizing only samples that occur in the proximity of a transition edge within the sync pulse. In this way, a noise signal that occurs at other sampling instants of the sync pulse, advantageously, will not substantially affect the phase difference signal.

Furthermore, it may be desirable to generat a correct phase difference signal even when the width of the given sync pulse or the period of the given sync pulse is not equal to an integer multiple of the sampling clock period.

In accordance with an aspect of the invention, a digital phase detector of a television apparatus generates a phase difference signal that is indicative of a phase difference between a first synchronizing input signal and a second input signal repetitive at a frequency related to a horizontal scanning frequency. The first input signal is sampled in accordance with a periodic clock signal to generate a sampled signal that contains first and second sampled values of the first input signal. Each of the first and second sampled values is representative of the first input signal at corresponding first and second instants that occur synchronously with respect to the clock signal. A transition instant of the first input signal is determined to occur when a synchronizing transition edge in the first input signal is estimated to occur. The phase difference signal is generated in accordance with a difference in time between the transition instant of the first input signal and a corresponding transition instant of the second input signal when a corresponding transition edge therein occurs.

Figure 1:
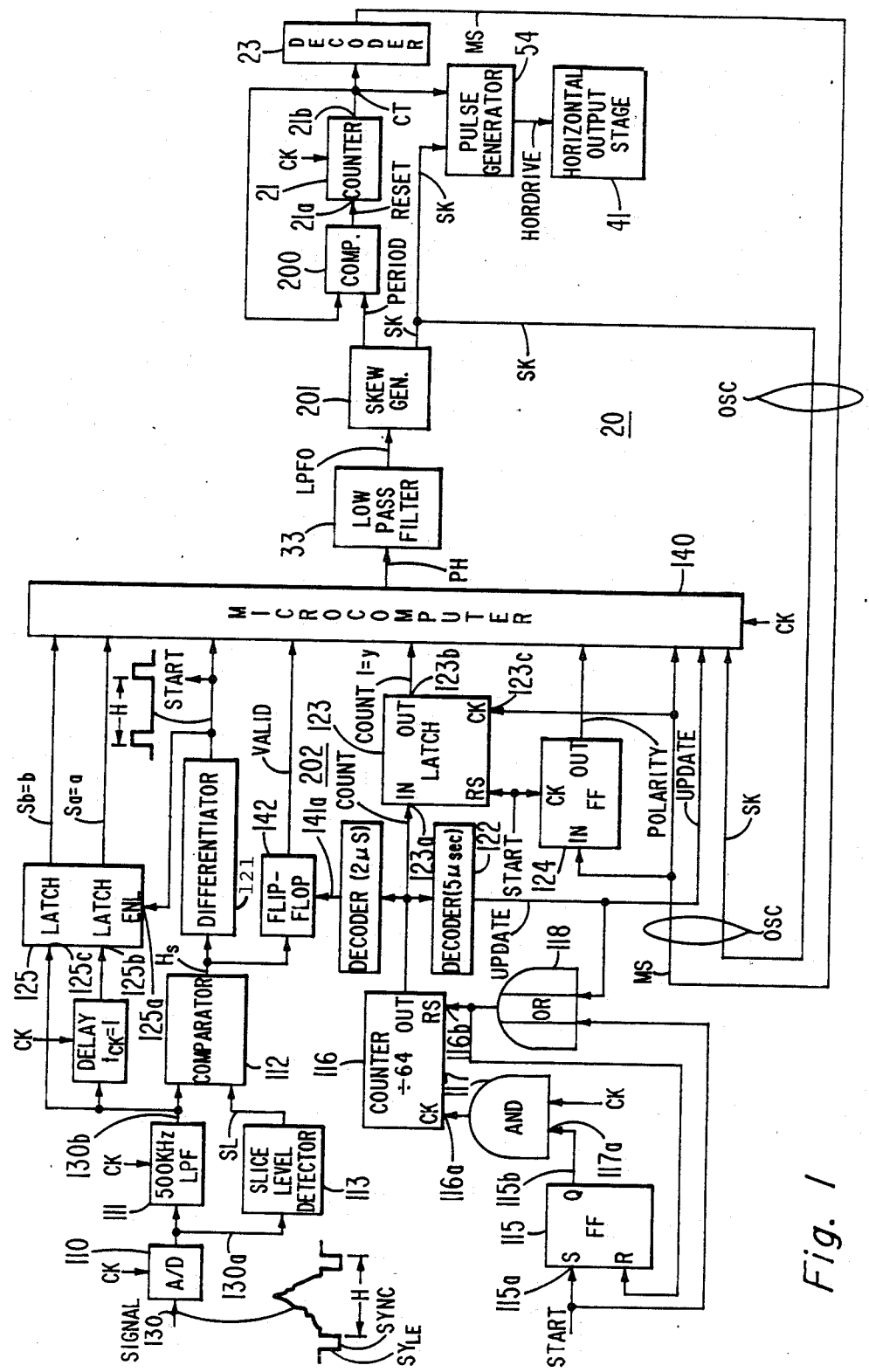
FIG. 1 illustrates a phase detector embodying the invention.

FIG. 1 illustrates a block diagram of a horizontal deflection circuit including a phase-lock-loop circuit (PLL) 20. It includes a sequential counter 21 that has the analogous function of a VCO of a conventional phase-lock-loop circuit. Counter 21 is a programmable counter that is incremented after each leading edge of a clock CK having a period $t_{CK}$, illustrated in the timing diagram of FIG. 2a. It counts up, from an initial value of, for example, 1 until it is reset to the initial value by a reset pulse RESET at an input terminal 21a of FIG. 1. Pulse RESET controls the number of clock CK periods $t_{CK}$ that are included in a corresponding period, or sequence, N, of counter 21.

A signal CT, at an output port 21b of counter 21, supplies, in a given sequence N, the current count of counter 21 that occurs coincidentally with clock CK. A skew signal SK, generated by a skew generator 201, as described later on, defines a fraction f of period $t_{CK}$ of clock CK. Signal CT together with signal SK define a corresponding timing, or transition edge in each sequence N that occurs, for example, once in each horizontal period H. The timing edge is shifted in time, by an amount that is determined in accordance with fraction f, relative to clock CK, and also relative to signal CT that occurs coincidentally with clock CK. Signal CT is also coupled to a decoder 23 that generates a signal MS having the period H that occurs coincidentally with clock CK. A pulse generator 54 generates, in accordance with signals SK and CT, a signal HORDRIVE, for example, once in each period H. Signal HORDRIVE provides the switching signal to a horizontal output stage 41 that operates at a frequency H that corresponds with that of signal HORDRIVE.

PLL 20 includes a phase detector 202, embodying an aspect of the invention. Phase detector 202 receives a signal 130. Signal 130 may be, for example, an analog, baseband, television signal that includes a signal portion that is referred to as synchronizing signal SYNC, occurring at the horizontal frequency $f_H$ in each period H. Phase detector 202 also receives signals MS and SK that, together, define a timing or transition edge OSC of a periodic signal. Edge OSC is to be phase-compared in detector 202 with signal SYNC having a leading edge $SY_{LE}$. Phase detector 202 generates a phase difference signal PH in accordance with a difference between the instants when edges OSC nd $SY_{LE}$ occur, respectively. Signal PH, that is analogous to an output signal of a phase detector of a conventional PLL, is used in PLL 20 for varying the phase of edge OSC to synchronize timing edge OSC to signal SYNC.

Signal PH is coupled via a low-pass-filter 33 that determines the response time of PLL 20. A filtered signal LPFO of filter 33 is coupled to an input terminal of a skew generator 201 that generates skew signal SK, that was mentioned before, and a signal PERIOD representative of the actual horizontal period H between sync pulses in integer number periods of clock CK. Signal PERIOD that is therefore also indicative of the period of sequence N is coupled to a comparator 200 that generates pulse RESET that resets counter 21, in accordance with signal PERIOD, for example, once in each period H.

Under transient condition, when timing edge OSC of PLL 20 is not yet in synchronism with signal SYNC, phase difference signal PH that is filtered in filter 33 varies the values of signals SK and CT in such a way to cause timing edge OSC to occur in synchronism with signal SYNC. The operation of a PLL that is similar to PLL 20 is described in detail in the Willis patent that is incorporated by reference herein. It should be understood that phase detector 202, embodying the invention, operates differently from a corresponding phase detector of the PLL of the Willis patent.

FIGS. 2a–2g illustrate waveforms useful for explaining the operation of detector 202 of FIG. 1. Similar symbols and numbers in FIGS. 1 and 2a–2g represent similar items or functions.

Analog baseband signal 130 of FIG. 1 is coupled from, for example, a video detector of a television receiver, not shown in the FIGURES. Signal 130 is sampled, once, in each period $t_{CK}$ of a clock CK by an analog-to-digital (A/D) converter 110 that produces a digitized signal 130a. When signal 130 is an NTSC type signal, the frequency of clock CK may be, for example, four times that of the color subcarrier.

Signal 130a is coupled via a digital lowpass filter 111 that generates from the samples of signal 130a a lowpass filtered signal 130b, shown schematically in FIG. 2b. Lowpass filter 111 of FIG. 1 reduces accompanying noise. Filter 111 also establishes a predetermined rate of change r' of a defined slope r between the corresponding values of consecutively occurring samples of the leading edge of signal 130 of FIG. 2b. The leading edge of signal 130b corresponds with leading edge $SY_{LE}$ of synchronizing signal SYNC that is included in signal 130 of FIG. 1. As a result of the smoothing operation of lowpass filter 111, the rate of change r' of slope r in signal 130b of FIG. 2b tends to remain substantially the same with variations in the slope of the leading edge $SY_{LE}$ in composite video signal.

Signal 130b is coupled to a first input port of a comparator 112 that receives at a second input port a slice level signal SL that may be generated in a conventionally designed slice level detector 113. Slice level signal SL may be in a simplified arrangement a constant signal; alternatively, it may be a dynamically variable signal that varies in accordance with the amplitude of signal 130.

As long as signal 130b of FIG. 2b is, for example, more positive than slice level signal SL, a sync signal $H_s$ of FIG. 2c, developed at an output terminal of comparator 112 of FIG. 1, is at a first, or FALSE state. Signal $H_s$ being FALSE indicates the occurrence of the corresponding portion in signal 130b that is not used for providing synchronizing information such as, for example, the entire active video line portion of a given period H. On the other hand, when signal 130b of FIG. 2b becomes less positive than slice level signal SL, that occurs after time $T_{fs}$ of FIG. 2c, the state of signal $H_s$ is TRUE, indicating the occurrence of sync pulse information in signal 130 of FIG. 1.

Signal $H_s$ of FIG. 1, having a leading edge that occurs at time $T_{fs}$ of FIG. 2c, occurs when signal 130b of FIG. 1 becomes less positive than slice level signal SL. Thus, a value of a difference between signals 130b and SL changes polarity at time $T_{fs}$ of FIG. 2b. Signal $H_s$ of FIG. 1 is coupled, for example, to a conventionally built differentiator 121 that generates a pulse START of FIG. 2g immediately following time $T_{fs}$. Pulse START is indicative of the occurrence of a corresponding level change in signal 130b of FIG. 1.

Undelayed signal 130b and signal 130b that is delayed by one period $t_{CK}$ of clock CK are coupled to input ports 125c and 125b, respectively, of a latch 125. Pulse START that is coupled to a clock receiving terminal 125a of latch 125 stores the corresponding signals at ports 125c and 125b at time $T_{fs}$ of FIG. 2b to provide output signals $S_b$ and $S_a$ of FIG. 1, respectively.

Signal $S_b$ provides the value of signal 130b of FIG. 2b at time $T_{fs}$, when signal 130b is less positive than signal SL. Similarly, signal Sa provides the value of signal 130b of FIG. 2b at the immediately preceding edge of clock $t_{CK}$ at a time $T_a$, when signal 130b is more positive than signal SL.

At time $T_a$ of FIG. 2b, that occurs coincidentally with clock CK, and one period $t_{CK}$ prior to time $T_{fs}$, the value of signal 130b that establishes signal $S_a$ of FIG. 1, is more positive than slice level signal SL of FIG. 2b by an amount, referred to as "a". Similarly, at time $T_{fs}$, the value signal 130b, that establishes signal $S_b$ of FIG. 1, is less positive than signal SL of FIG. 2b by an amount, referred to as "b".

Pulse START is also coupled to a SET input terminal 115a of a RESET-SET (R-S) flip-flop 115, causing an output signal 115b to assume a TRUE state at an output Q terminal of flip-flop 115, that is coupled to an input 117a of an "AND" gate 117. The signal at output Q terminal being TRUE, enables "AND" gate 117 to couple the pulses of clock CK to a clock receiving input terminal 116a of a counter 116 that counts the pulses of clock CK. Pulse START is additionally coupled through an "OR" gate to a RESET input terminal 116b of counter 116 for initializing an output signal COUNT of counter 116 to zero at the beginning of each computation cycle of a microcomputer 140 that computes the value of a signal PH. Each computation cycle occurs when pulse START occurs.

Signal COUNT provides the state of counter 116 and is used to provide various time-out information as will be described below. Signal COUNT of counter 116, for example, increments once each time clock CK occurs from the initial value that is zero until signal COUNT reaches an upper limit of, for example, 64.

Signal COUNT is coupled to an input port of a decoder 141 that generates a triggering edge 141a when signal COUNT attains a predetermined value that represents a time-out interval of, for example, two microseconds. Triggering edge 141a is coupled to a triggering edge receiving input terminal of a flip-flop 142. Edge 141a causes flip-flop 142 to store the TRUE/FALSE state of signal $H_s$ at the end of such time-out interval to form a signal VALID that is coupled to microcomputer 140.

In the event that signal $H_s$ is FALSE at the end of the time-out interval, when edge 141a occurs, signal VALID becomes FALSE. This may result from a sync signal SYNC of signal 130 being narrower than the minimum requirement of two microseconds. On the other hand, if signal $H_s$ is TRUE at the time edge 141a occurs, representing a sufficientlyacceptable duration of sync signal SYNC, signal VALID becomes TRUE. Only when signal VALID is TRUE, will microcomputer 140 compute the value of phase difference signal PH, as described later on.

When signal COUNT has reached the upper limit that in this example is equal to 64, representing a time out interval of approximately 5 microseconds, a decoder 122 that receives signal COUNT generates a signal UPDATE that is coupled through "OR" gate 118 to terminal 116b of counter 116 for initializing counter 116 to zero again to restart the computation cycle of signal PH.

Signal COUNT is also coupled to an input port 123a of a latch 123 that stores the value of signal COUNT, referred to hereinafter as value y, when an edge MSa of oscillator signal MS of FIG. 2e occurs. Thus, an output signal COUNT1 at an output port 123b of latch 123 of FIG. 1 contains the value y of signal COUNT that occurs when edge MSa of oscillator signal OSC of FIG. 2e occurs. Signal COUNT1 or value y is indicative of the time elapsed between the leading edge of pulse START, at time $T_{fs}$ of FIG. 2g, and edge MSa of edge OSC of FIG. 2e that occurs at time $T_1$.

Assume that in the embodiment of FIG. 1 signal MS changes simultaneously with signal COUNT. Therefore, the value y respresents signal COUNT1 prior to the occurrence of signal MS. It follows that the length of interval $T_{fs}-T_1$ is equal to $(y+1)$ multiply by $t_{CK}$, as shown in FIG. 2f.

Pulse START of FIG. 1 is coupled to a reset input RS of latch 123 to cause signals COUNT1 and COUNT to be initialized to zero at the beginning of each computation cycle of signal PH.

The computation by microcomputer 140 of signal PH in a given computation cycle begins when counter 116 reaches the upper limit=64, thereby generating signal UPDATE in decoder 122 which is then read by the microcomputer 140. For the purpose of explaining the computation algorithm of signal in microcomputer 140, assume that the period $t_{CK}$ of clock CK is normalized and is equal to unity.

In its first step of the computation cycle, microcomputer 140 tests signal VALID. If signal VALID is FALSE, indicating that the duration of sync signal SYNC is narrower than, for example, the minimum required two microseconds, microcomputer 140 rejects the current signal SYNC and considers the signal as being invalid. Microcomputer 140 than begins testing again the output of decoder 122 for detecting signal UPDATE in the next computation cycle. If signal VALID is TRUE, microcomputer 140 proceeds to compute signal PH in the current computation cycle in a second step which tests signal COUNT1.

A first hypothetical situation exists if the value y of signal COUNT1 is different from zero. This situation exists when the phase difference is within a window period of, for example, approximately 5 microseconds that is determined by the upper count limit 64 of counter 116. In this situation, edge MSa of FIG. 2e occurs before counter 116 of FIG. 1 reaches its upper limit. As mentioned previously, counter 116 begins counting upon the occurrence of pulse START such as at time $T_{fs}$ of FIG. 2d and ends counting approximately 5microseconds later at a count of 64clock periods at time $T_{es}$.

A simulated sync signal SIM of FIG. 2d has a duration that corresponds with the window period. Signal SIM that represents a mathematical equivalent of sync signal 130b of FIG. 1 is analytically reconstructed by microcomputer 140 from the samples of signal 130b by means of interpolation. Signal SIM of FIG. 2d has a leading edge where the characteristic slope r of signal 130b of FIG. 2b is computed to be equal to slice signal SL at a zero crossing time $T_{zc}$ that occurs between times $T_a$ and $T_{fs}$. Time $T_{zc}$ is calculated in microcomputer 140 by, for example, simple trigonometric interpolation from the values "a" and "b" of FIG. 2b derived from signals $S_a$ and $S_b$ stored in latch 125 of FIG. 1. Other conventional interpolation techniques may be used instead of the trigonometric one. The result of the computational interpolation is that crossover time $T_{zc}$ is computed to occur before time $T_{fs}$ by an interval X of FIG. 2a, where; X is a fraction of clock period $t_{CK}$ and is equal to $X=b/(a+b) \times t_{CK}$.

In accordance with an aspect of the invention, time $T_{zc}$ of FIG. 2d defines the time, to within a fraction of a clock period, when a leading edge occurs of simulated, or computed, sync signal SIM of FIG. 2d. Signal SIM is derived from the synchronizing pulse in video signal 130 of FIG. 1. Therefore, computation of phase difference signal PH of FIG. 1 may be based on the use of simulated signal SIM to advantageously generate phase difference signal PH to within a fraction of a clock.

In carrying out an additional aspect of the invention, simulated sync signal SIM of FIG. 2d, having a leading edge at time $T_{zc}$, is defined as having a fixed rather than a variable width. The fixed width is selected to equal an integer k, such as, for example, k=65, multiplied by the length of period $t_{CK}$ of clock CK of FIG. 2a.

The value k determines a dynamic range or the window period of phase detector 202 of FIG. 1. When the time difference between the input signal SYNC and edge OSC is smaller than approximately 5 microseconds, as determined by the width of signal SIM, a change in phase in edge $SY_{LE}$, for example, will cause a corresponding proportional change in signal PH. Outside the dynamic range, a change in phase will not produce any corresponding proportional change in signal PH. Thus outside the dynamic range signal PH may retain a constant value . Such characteristic of detector 202 is useful for obtaining a fast settling time in PLL 20 when a phase perturbation occurs in, for example, signal SYNC.

To provide for a width of k=65, the simulated trailing edge of simulated signal SIM of FIG. 2d is defined to occur at a time $T_e$. Time $T_e$ occurs after the lapse of an interval $(1-b/(a+b))$ clock periods $t_{CK}$ following that edge of clock CK that is coincident with time $T_{es}$. Time $T_{es}$ follows time $T_{fs}$ by $64 \times t_{CK}$ clock periods. During the interval $T_{zc}-T_e$ of FIG. 2d, simulated sync signal SIM is defined to be at a TRUE state.

Figure 2:
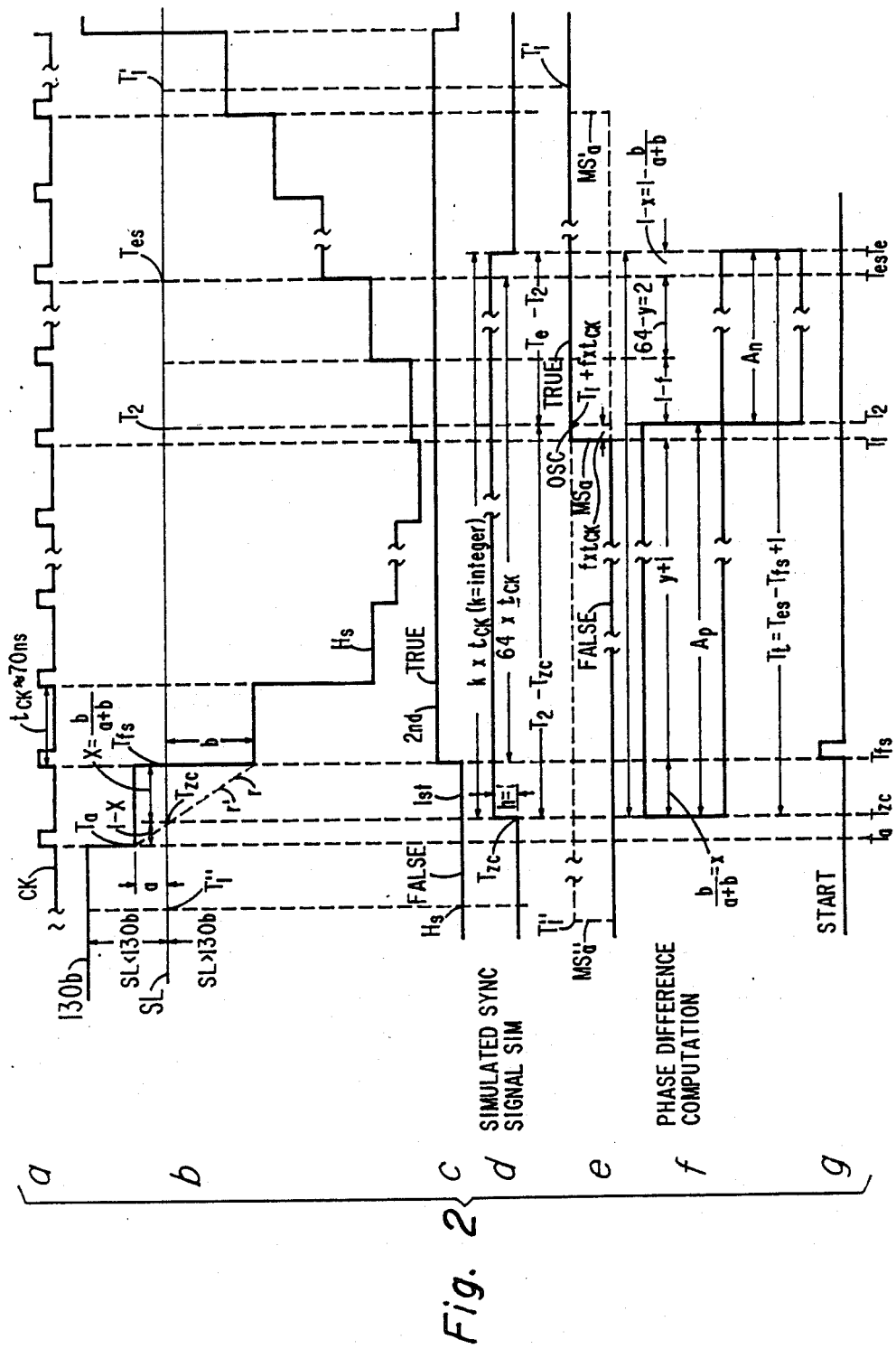
FIGS. 2a–2g illustrate waveforms useful in explaining the operation of the phase detector of FIG. 1.

Edge OSC of FIG. 2e that is to be phase compared with signal SIM of FIG. 2d includes signals MS and SK of FIG. 1, as described before. Transition edge MSa of signal MS, that occurs at, for example, time $T_1$, occurs coincidentally with a corresponding edge of periodic clock CK of FIG. 2a. Also as described before, signal SK of FIG. 1, that is referred to as a skew signal, is a digital word that represents the value of a fraction f of period $t_{CK}$ of clock CK of FIG. 2a. Taken together, signals MS and SK of FIG. 1, define periodic timing edge OSC. Edge OSC is analogous to the output signal of a VCO of a conventional PLL. Edge OSC occurs at time $T_2$ of FIG. 2e that occurs, for example, at time $T_2 = T_1 + f \times t_{CK}$. Time $T_2$ therefore occurs between transition edge MSa and that of the next clock CK of FIG. 2. Edge OSC is thus defined with a resolution that is better than period $t_{CK}$ of FIG. 2a.

In accordance with a further aspect of the invention, periodic timing edge OSC of FIG. 2e is phase compared in detector 202 of FIG. 1 with simulated signal SIM of FIG. 2d. Because simulated signal SIM of FIG. 2d has a width that is equal to integer multiple k of period $t_{CK}$, the phase computation of signal PH, advantageously, remains correct even when both the duration of horizontal period H and the width of sync signal SYNC of video signal 130 of FIG. 1 are not, each, equal to an integer multiple of period $t_{CK}$. The duration of the period H may vary when video signal 130 of FIG. 1 is, for example, generated by a video tape recorder.

Advantageously, samples of signal 130b of FIG. 2b that are not associated with leading edge $SY_{LE}$ of FIG. 1 are excluded from affecting the computation of signal PH. Since the information needed to construct simulated sync signal SIM is obtained from the sampled sync signal 130b only at times $T_a$ and $T_{fs}$ of FIG. 2b, any noise that is associated with signal 130b at other times, advantageously, does not significantly affect the accuracy of the computation of phase difference signal PH of FIG. 1.

In carrying out an aspect of the invention, phase difference signal PH is related to the time difference between the leading edge of simulated sync signal SIM of FIG. 2d and transition edge OSC of FIG. 2e, as defined by signals MS and SK of FIG. 1. This difference is derived by microcomputer 140 by computing the difference between the length of interval $T_2 - T_{zc}$ of FIGS. 2d-2g and the length of interval $T_e - T_2$.

The length Ap in FIG. 2f of interval $T_2 - T_{zc}$ of FIG. 2d is equal to the sum of three terms: $b/(a+b)$, $y+1$ and fraction f. As explained before, the term $b/(a+b)$ is equal to the length of interval X of FIG. 2b, the value y is contained in signal COUNT1 of FIG. 1, and fraction f is contained in skew word SK. The length $A_n$ of FIG. 2f of interval $T_e - T_2$ of FIG. 2d is equal to the sum of three terms: $1-f$, $64-y-2$ and $(1-b/(a+b))$, as shown schematically in FIG. 2f. Thus, signal PH of FIG. 1 is equal to a difference $A_p - A_n$ that is equal to $2b/(a+b) + (2f) + 2f) + (2y - 63)$. The first parenthetical term may include a fraction of period $t_{CK}$. The second parenthetical term indicates an integer multiple of period $t_{CK}$.

The closer that edge OSC of FIG. 2e is to time $T_{zc}$, the more negative is signal PH of FIG. 1. On the other hand, the closer that edge OSC of FIG. 2e is to time $T_e$, the more positive is signal PH of FIG. 1. Phase difference signal PH is zero when timing edge OSC of FIG. 2e occurs at a predetermined instant relative to time $T_{zc}$ that is approximately at the center of interval $T_{zc} - T_e$ of FIG. 2d.

In accordance with an aspect of the invention, phase difference signal PH is proportional to the time difference between time $T_2$, corresponding to transition edge OSC of FIG. 2e as defined by signals MS and SK of FIG. 1, and time $T_{zc}$ of FIG. 2d, determined by the leading transition edge of sync signal SYNC of signal 130 of FIG. 1. To derive this time difference, microcomputer 140 of phase detector 202 uses synchronization information derived from simulated signal SIM having a leading transition edge that is determined by the leading edge of sync signal SYNC of signal 130 of FIG. 1 and having a width that is equal to an integer multiple of clock period $t_{CK}$. The other information used is the oscillator timing information derived from skew signal SK, and from signal MS having edge MSa that occurs coincidentally with clock CK.

This concludes an explanation of the first hypothetical situation where oscillator edge OSC of FIG. 2e occurs inside the window period, or interval $T_{zc} - T_e$ of FIG. 2d that is defined by simulated signal SIM. Such window period is established by signal SIM. The length of the window period is equal to, for example, approximately 5 microseconds, as described before.

In second and third hypothetical situations, that are described below, the phase difference is outside the window period that is established by signal SIM. In these situations, it may be desirable, to establish signal PH at a constant level in order to obtain a fast response or settling time of PLL 20 of FIG. 1 when phase perturbation occurs. Such constant level of signal PH has a corresponding polarity that is indicative of a phase lag, when the second situation exists, or of a phase lead, when the third situation exists. Accordingly, pulse START is also coupled to a triggering terminal of a flip-flop 124 that stores the TRUE/FALSE state of signal MS of FIG. 2d at time $T_{fs}$ to generate the corresponding TRUE/FALSE state of a signal POLARITY that is used for distinguishing between the second and third situations. The state of signal POLARITY of FIG. 1 at an output terminal of flip-flop 124 provides microcomputer 140 with the state of signal MS at time $T_{fs}$ of FIG. 2e. Signal POLARITY is used in the second and third hypothetical situations for determining whether the phase difference is positive or negative.

The second hypothetical situation exists when the phasing between sync signal SIM and oscillator edge OSC occurs after time $T_e$ of FIG. 2e. In this situation, both the value y of signal COUNT1 of FIG. 1 is zero and signal POLARITY, that is tested by microcomputer 140, is FALSE. This occurs, for example, when edge MSa' of signal MS and the corresponding edge OSC of FIG. 2e occur, after time $T_e$, as shown by the corresponding dashed line in FIG. 2e. In the second hypothetical situation microcomputer 140 of FIG. 1 establishes signal PH to be at a constant predetermined positive value that is the same irrespective of the particular value of the phase difference.

A third hypothetical situation exists when the phasing between sync signal SIM and oscillator edge OSC is such that edge OSC occurs prior to time $T_{zc}$ of FIG. 2e. In this situation, both the value y is zero and signal POLARITY is TRUE. This occurs where edge MSa" of signal MS of FIG. 2e occurs prior to time $T_{zc}$, as shown by the corresponding dashed line. In the third hypothetical situation, signal PH of FIG. 1 is established by microcomputer 140 to be at a constant predetermined negative value that is the same irrespective of the particular value of the phase difference.

After the computation of signal PH is accomplished, microcomputer 140 begins testing for the next occurrence of signal UPDATE. When signal UPDATE is again detected after signal SYNC of the following period H is received, the computation cycle of signal PH begins again.

What is claimed:

1. A digital phase detector responsive to first and second input signals for generating a phase difference signal that is indicative of a phase difference therebetween, comprising:
   a source of a periodic clock signal;
   sampling means responsive to said first input signal and to said clock signal for sampling said first input signal to generate a sampled signal that contains first and second sampled values of said first input signal, each of said first and second sampled values being representative of said first input signal at corresponding first and second instants that occur synchronously with respect to said clock signal; and
   computing means being responsive to said sampled signal for computing, by interpolation of said first and second sampled values, a third value that is representative of said first input signal at a third instant when a transition edge in said first input signal is estimated to occur, said computing means further being responsive to said second input signal for computing a difference between said third instant and a corresponding instant when a corresponding transition edge in said second input signal occurs to generate said phase difference signal in accordance with said difference.

2. A phase detector according to claim 1 wherein said computing means comprises a microcomputer.

3. An apparatus according to claim 1 wherein said second input signal comprises a first signal part that is synchronous with said clock signal and a second signal part containing a value that is indicative of a fraction of the period of said clock signal such that both said first and second parts in combination are indicative of said corresponding instant when said corresponding transition edge occurs in said second input signal to within a fractional period of said clock signal.

4. An apparatus according to claim 3 wherein said second signal part defines said corresponding instant relative to an instant that is defined by said first signal part.

5. An apparatus according to claim 3 wherein said computing means generates said phase difference signal in accordance with a fourth instant separated from said third instant by an integer multiple of the period of said clock signal.

6. An apparatus according to claim 5 wherein said computing means generates said phase difference signal at a predetermined value that remains unchanged when said corresponding transition edge in said second input signal occurs outside an interval that is between said third and fourth instants.

7. An apparatus according to claim 1 wherein said first input signal is representative of a synchronizing pulse in a baseband video sigal.

8. An apparatus according to claim 1 wherein said first input signal is at a horizontal rate.

9. An apparatus according to claim 7 further comprising a comparator responsive to a synchronizing pulse slice level signal and to said sampled signal for generating a third signal when a difference therebetween changes polarity.

10. An apparatus according to claim 9 further comprising means responsive to said third signal and to said sampled signal for selecting said first and second sampled values such that each of said first and second instants is determined relative to an instant when said third signal is generated.

11. An apparatus according to claim 10 wherein said computing means is responsive to said third signal for estimating said transition edge in said first input signal to occur at said third instant that occurs prior to the generation of third signal by an interval that is related to said first value divided by a sum of said first and second values.

12. An apparatus according to claim 10 wherein said computing means is responsive to said third signal for estimating said transition edge in said first input signal to occur at said third instant that is intermediate said first and second instants.

13. In a television apparatus, a digital phase detector for generating a phase difference signal that is indicative of a phase difference between a first synchronizing input signal and a second input signal repetitive at a frequency related to a horizontal scanning frequency, comprising:
   a source of a periodic clock signal;
   sampling means responsive to said first input signal and to said clock signal for sampling said first input signal to generate a sampled signal that contains first and second sampled values of said first input signal, each of said first and second sampled values being representative of said first input signal at corresponding first and second instnts that occur synchronously with respect to said clock signal;
   means responsive to said first and second sampled values for determining a transition instant of said first input signal when a synchronizing transition edge in said first input signal is estimated to occur; and
   means responsive to said second input signal for generating said phase difference signal in accordance with a difference in time between said transition instant of said first input signal and a corresponding transition instant of said second input signal when a corresponding transition edg therein occurs.

14. A digital phase detector responsive to a first input signal having a pulse that includes a first transition edge and a second transition edge that changes in opposite manner to that of said first transition edge such that both said first and second transition edges define said pulse, and responsive to a second input signal for generating a phase difference signal that is indicative of a phase difference between said first and second input signals, comprising:
   a source of a periodic clock signal;
   sampling means responsive to said first input signal and to said clock signal for generating a sampled signal that contains a plurality of sample portions that are representative of corresponding levels in said first input signal;
   second means responsive to said sampled signal for selecting, from said plurality of sample portions at least a first sample portion that is indicative of a first instant when said first transition edge occurs such that, in selecting said first sample portion, said second means excludes each sample portion of said plurality of sample portions that corresponds to any portion of said pulse that is not substantially associated with said first transition edge, said second means being responsive to said second input signal for generating said phase difference in accordance with said second input signal and in accordance with said first sample portion to the substantial exclusion of the remaining ones of said plurality of sample portions.

15. A phase detector according to claim 16 wherein said second means detects a change in said sampled signal that is indicative of the occurrence of said first transition edge and selects from said plurality of sample portions a second sample portion that corresponds to a portion of said first input signal that occurs prior to said first instant for generating said phase difference in accordance with said first and second sample portions.

16. A phase detector according to claim 15 wherein said second means generates in accordance with said first and second sample portions, using interpolation, a first value that is representative of said first instant such that said first instant occurs intermediate an instant that corresponds with said first sample portion and an instant that corresponds with said second sample portion.

17. A phase detector according to claim 16 wherein the length of an interval between said instants that correspond with said first and second sample portions is equal to the period of said clock signal.

18. A phase detector according to claim 16 wherein said second means generates in accordance with said first value a second value that is indicative of a time elapsed between said first instant and an instant that corresponds with a transition edge in said second input signal.

19. A phase detector according to claim 14 wherein said second input signal includes a first signal portion that represents a transition edge in said second input signal with a resolution that is in accordance with the period of said clock signal and a second signal portion that represents a skew of said transition edge relative to said first signal portion of said second input signal with a resolution of a fraction of the period of said clock signal.

20. A phase detector according to claim 14 wherein said phase difference signal is capable of providing phase information that is required for controlling a horizontal phase-lock loop circuit of a television apparatus.

* * * * *